United States Patent Office 3,671,356
Patented June 20, 1972

3,671,356
METHOD OF FORMING A PEELABLE SEAL BETWEEN PROPYLENE POLYMER AND A CARBOXYLATED POLYPROPYLENE COATED SURFACE
Henry J. Keinanen, Oak Lawn, Ill., assignor to Continental Can Company, Inc., New York, N.Y.
Filed June 8, 1970, Ser. No. 44,505
Int. Cl. C09j 5/00, 7/00
U.S. Cl. 156—309           11 Claims

ABSTRACT OF THE DISCLOSURE

A cleanly separable seal between a propylene polymer layer heat sealed to a surface coated with a carboxyl modified polypropylene containing layer is obtained by treating at least one of the layers to be sealed with a normally solid thermoplastic vinyl aromatic polymer or a polar polymer before the two layers are heat sealed together.

BACKGROUND OF THE INVENTION

(1) Field of invention

This invention relates generally to bonding propylene polymer surfaces to carboxyl containing propylene polymer surfaces and more particularly to effecting a cleanly separable or peelable heat seal between the bonded surfaces.

(2) The prior art

Easy opening containers are known to the art. These containers are generally formed of metal and are provided with a pour opening. The pour opening generally occupies only a portion of the end panel of the container. Heretofore, the pour opening has generally been formed by scoring to define a tear strip. A pull tab is attached to the tear strip, and upon the application of a force, the pull tab is operative to separate the tear strip along the weakening line from the panel.

Although easy opening containers have been readily accepted by the public, deficiencies still remain in this type of container. One of these deficiencies is that the removable tear strip which is torn from the can end in the opening of the can has sharp edges, and when thrown on the ground or otherwise improperly disposed of, remains as a nuisance which presents a cutting hazard to the public.

It has been proposed to replace the metal tear strip with a plastic closure member which will eliminate the cutting hazard in that the removed portion does not have sharp edges on which a person may be cut. The plastic closure member fabricated from a thermoplastic resin, such as polypropylene, is detachably and sealably secured to the outer periphery of the pour opening in the end panel of the container by bonding with a suitable adhesive. Container end panels used for beverages and the like have been coated with a heat activatable adhesive layer to provide a surface for bonding a plastic closure member to the container end panel to seal the pour opening. In this manner, the plastic closure member is heat sealed to and fixed about the periphery of the opening until a pulling force is applied thereto.

In copending patent application Ser. No. 855,878, filed Sept. 8, 1969 assigned to a common assignee, there is described a method for sealing the pour opening of a container with a plastic closure of the type described above, wherein the closure member fabricated from a propylene polymer is heat sealed to the enamel coated surface of a metal can end which has been further coated a heat activatable bond promoting adhesion promoting layer containing a carboxyl modified polypropylene or carboxylated polypropylene resin.

Although the method of Ser. No. 855,878 is highly effective for bonding the propylene polymer closure to a metal can end, it has been determined upon further experimentation that the strength of the heat seal exceeds the tensile strength of the propylene polymers used in the fabrication of the closure. When removal of the closure is attempted, a portion of the closure member adheres to the carboxylated polypropylene coated surface with the result that the surface of the can end in the heat seal area has an unesthetic, rough and jagged appearance which is undesirable from the standpoint of consumer appeal. Further, because of the high strength bond, the force required to effect the removal of the closure is too high for widespread consumer acceptance.

Therefore, in order for a plastic closure to obtain rapid consumer acceptance, it is necessary that the plastic closure properly seal the pour opening in the container end, and when removal of the closure is attempted, the closure be readily or cleanly separable from the can end, and leave a smooth residual surface thereon.

SUMMARY OF THE INVENTION

In accordance with the present invention there is provided a method of heat sealing a propylene polymer layer to surface coated with a layer of heat activatable adhesion promoting composition containing a carboxyl modified polypropylene resin, the propylene polymer layer being readily peelable or cleanly separable from the carboxyl modified polypropylene containing layer wherein before heat sealing of the layers at least one of the layers is treated with a thermoplastic polymer selected from the group of polar polymers and vinyl aromatic polymers.

PREFERRED EMBODIMENTS

Figure 1:
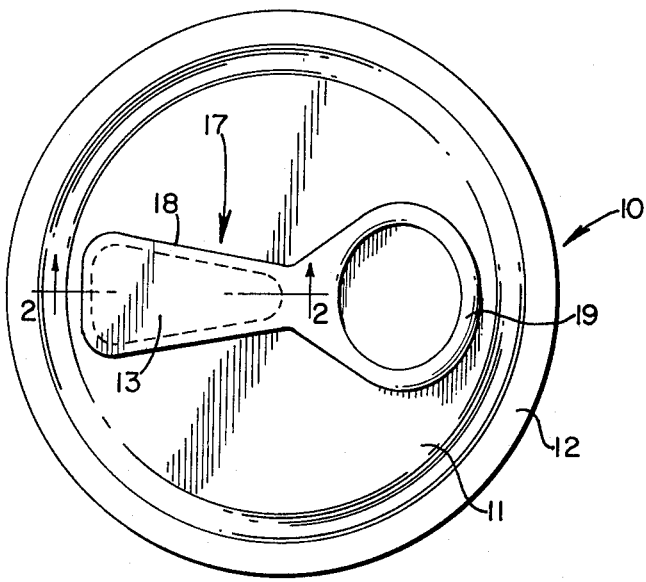
FIG. 1 is a top plane view of a container having an easy opening structure provided with a propylene polymer closure member.
Figure 2:
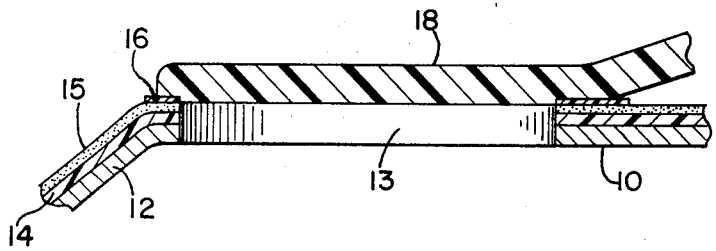
FIG. 2 is an enlarged cross sectional view taken generally along the lines 2—2 of FIG. 1 showing the propylene-polymer closure member secured to the end panel surface in accordance with the present invention.

The carboxyl modified polypropylene which is utilized in the practice of the present invention is prepared by grafting an unsaturated dicarboxylic acid or anhydride onto a polypropylene backbone using high energy radiation or peroxy catalysts as described in Belgian 607,269. Unsaturated dicarboxylic acids or anhydrides which can be employed to prepare the carboxyl modified polypropylene resins include maleic, tetrahydrophthalic acid, fumaric acid, itaconic, nadic, methyl nadic and their anhydrides.

The amount of unsaturated dicarboxylic acid or anhydride which can be grafted onto the polypropylene ranges from about 0.05 to about 10 percent by weight based on the total weight of the grafted polymer and generally, the amount of grafted dicarboxylic acid or anhydride ranges from about 0.5 to about 5.0 percent.

When the carboxyl modified polypropylene resin is utilized as an adhesion promoting layer for bonding a propylene polymer closure to an enamel coated metal end, the carboxyl modified polypropylene resin is applied as a dispersion in a high boiling, volatile organic solvent.

When used as an adhesion promoting resin for metal surfaces, the carboxylated polypropylene resin is preferably applied to the metal surface in admixture with polypropylene resin particles. The incorporation of the polypropylene resin in the dispersion is required in commercial coating methods. Generally, the polypropylene resin is incorporated in the dispersion at a weight ratio to the carboxyl modified polypropylene resin in a range from about 85:15 to 99:1.

In metal containers end applications, the dispersion containing the carboxyl modified polypropylene resin can be satisfactorily applied to an enamel coated metal end at a solids content ranging from about 15% to about 25% by weight, based on the total weight of the dispersion composition to provide a dry film weight of the coating in the range of 1.5 to 3.5 milligrams of dry coating per square inch of enamel coated surface.

The dispersion containing the adhesion promoting carboxyl modified polypropylene composition can be satisfactorily applied by any of the conventional methods employed by the coating industry. However, for coating of enameled sheet metal used in container fabrication, gravure or direct roller coating are preferred methods, as the desired coating weight is easily and conveniently applied in a single coat. Spraying, dipping and flow coating are also useful methods of applying the coating dispersion.

After applying the dispersion, the solvent is volatilized by heating the coated substrate. Generally, the substrate is heated at a temperature of about 175° to about 200° C. for about 2 to about 6 minutes to volatilize the solvent.

In applications where the carboxyl modified polypropylene composition is to be applied to a metal surface, it is desirable to coat the metal surface with an enamel coating before application of the composition. Any of the thermosetting resins, such as epoxy resins, phenol/aldehyde resins, amine/aldehyde resins and mixtures thereof conventionally used in the coating art may be employed as an enamel coating for the metal surface prior to the application of the carboxyl modified polypropylene composition thereto. A more detailed description of these enamel coatings and the method of applying these coatings to metal surface is further disclosed in U.S. S.N. 855,878.

Propylene polymers which are bonded to the carboxyl modified polypropylene coated surface in accordance with the practice of the present invention include polypropylene, and propylene/ethylene copolymers containing about 1% to 10% ethylene.

Thermoplastic polymers which may be used to treat the propylene polymer layer and/or the carboxyl modified polypropylene layer to create a cleanly separable seal between the bonded layers upon heat sealing in accordance with the practice of the present invention, include vinyl aromatic polymers and polymers of ethylenically unsaturated polar monomers.

Examples of vinyl aromatic polymers useful as materials for promoting a peelable seal include polymers of styrene and copolymers of styrene and ethylenically unsaturated polar monomers. Polar polymers include polycarbonate and polyester resins presently known to the art.

In general, the term "polar polymer" includes within its meaning homopolymers, copolymers and terpolymers prepared from monomers having polar groups such as carboxyl, carbonyl, hydroxy or amino groups or mixtures of such polar monomers. Examples of polar monomers from which polar polymers can be prepared include alpha, beta-ethylenically unsaturated carboxylic acids having 1 to 6 carbon atoms such as acrylic acid, methacrylic acid, maleic acid, fumaric acid the anhydrides thereof, the esters of alpha, beta-unsaturated carboxylic acids such as the alkyl esters wherein the alkyl group has 1 to 8 carbon atoms such as methyl acrylate, methyl methacrylate, ethyl acrylate, n-butyl acrylate, n-butyl methacrylate, ethyl methacrylate, cyclohexyl acrylate, other esters include esters of the alpha, beta unsaturated carboxylic acids and alcohols such as methylol cyclohexane, glycols such as polyethylene glycol, trimethylol, propane, esters of unsaturated alcohols such as monoallyl phthalate and terephthalate, allyl adipate, allyl-2-ethylhexanoate, unsaturated ethers such as vinyl isobutyl ether, vinyl-2-ethylhexylether, basic nitrogen containing monomers such as acrylamide, acrylonitrile, vinyl pyridine and the lower allyl derivatives thereof, ketones and aldehydes such as isopropenyl acetoacetate, methyl vinyl ketone, and methyl isopropenyl ketone and chlorine containing monomers such as vinyl chloride and vinylidene chloride. Also included with the definition of polar polymers are copolymers of the polar monomer and a monoethylenically unsaturated hydrocarbon monomer such as ethylene, propylene, butylene, and the like. Such copolymers include, for example ethylene/ethylacrylate copolymers, ethylene/vinyl acetate copolymers, ethylene/acrylic acid copolymers, ethylene/methacrylic acid copolymers and the like.

The polar polymer or vinyl aromatic polymer may be applied either to the carboxyl modified polypropylene surface or to the propylene polymer surface before heat sealing by any means desired. For example, a thin film of the polar polymer formed by extrusion in the usual manner, can be applied to the surface of the propylene polymer and fused thereto. Pressure, e.g. by chill rolls may be applied if desired. Alternatively, a solution or a dispersion of the polar or vinyl aromatic polymer may be used to deposit the polymer on either of the surfaces to be bonded. Generally when using dispersions of either the aromatic or polar polymer, it has been found desirable to apply the polymer from a solution or dispersion having about a 0.5 to about 2.0% by weight solids content. If solutions or dispersions are employed which have substantially less than 0.5% solids content, the bond between the carboxyl modified propylene surface and the propylene polymer is not easily separable or peelable. If the applied solution or dispersion of the polymer has a solids content substantially greater than about 2% by weight the bond formed between the layers is of too low strength to form a hermetic seal. As an alternative to contacting the surfaces of the layers to be bonded, the vinyl aromatic polymer or polar polymer may be mixed and directly incorporated in either of the layers to be bonded. Generally the vinyl aromatic polymer or the polar polymer can be blended with the carboxyl modified polypropylene containing composition or the propylene polymer at a concentration of about 0.1 to about 20 percent by weight based on the weight of the carboxyl modified polypropylene containing composition or the propylene polymer.

The propylene polymer layer is bonded to the carboxyl modified polypropylene layer by heat sealing at a temperature of about 175° to about 225° C. and preferably at a temperature of 180° to 200° C. Heat sealing may be accomplished by any means known to the art, such as heated parts or wires, induction heating, using dwell times varying from 10 to 100 milliseconds.

After the propylene polymer layer is heat sealed and bonded to the carboxyl modified polypropylene coated metal surface, the assembly is cooled or chilled to ambient temperature, as, for example, room temperature, in any suitable manner, as by air cooling, flooding with water, or by any other appropriate procedure that does not disturb the applied propylene polymer layer.

Referring now to the drawings, and in particular to FIG. 1, there is shown a container top end assembly 10 of a container. The end assembly 10 is made of metal such as tin plate, tin-free steel or aluminum. The end assembly 10 comprises a central panel 11 having a bead formed adjacent the outer periphery from which there depends a peripheral flange 12. The peripheral flange 12 is curled and double seamed with an outwardly extending flange at the upper end of a container body in the usual manner.

The panel 11 in the embodiment illustrated in the drawing is shown with a pour opening 13 through which the contents of the container are poured.

It is to be understood that the opening 13 may assume any configuration, and is not limited to the conventional tear drop design shown.

The top surface of the end assembly 10 is coated with a first layer of a thermosetting enamel coating, such as an epoxy-urea/formaldehyde resin 14. To the enamel coating is applied a second layer of an adhesion promoting layer 15 containing a carboxyl modified polypropylene resin, such as a polypropylene/maleic anhydride graft copolymer. To the adhesion promoting layer 15 in the peripheral heat seal area of the opening 13 is applied peel seal promoting layer 16 of a vinyl aromatic polymer or polar polymer. Peelably secured to the peel seal coated periphery of the opening 13 is a propylene polymer closure member 17. The propylene polymer closure member 17 has a sealing flap 18 for closing the opening 13. Integrally extending from the sealing flap 18 is a pull ring portion 19. The sealing flap 18 of closure member 17 is heat sealed to the peel seal coated periphery of the opening 13 at a temperature of 180° to 200° C.

The peelable bond that is formed due to the presence of intermediate layer 16 permits the flap 18 to be separated cleanly from the metal end by the application of a pulling force at the ring portion 19. Preferably, the pull ring portion 19 is formed with an opening size to receive the finger of a user. The heat to achieve bonding is preferably applied by radio-frequency (RF) heating of the metal surface. RF heating is used so as to localize the heat in the peripheral edge portion of the opening 13, thereby to minimize the buckling of the relatively thin metal from which the end 10 is made. In this manner, the sealing flap 18 is firmly fixed about the peripheral portion of opening 13 and remains adhered thereto.

To illustrate the manner in which the present invention may be carried out, the following example is given. It is to be understood, however, that the example is for the purpose of illustration, and the invention is not to be regarded as limited to any of the specific materials or conditions recited therein.

EXAMPLE

A bond-promoting coating formulation was prepared using a carboxyl modified polypropylene resin admixed with finely divided unmodified polypropylene resin particles at a weight ratio of 5:95. The carboxyl modified polypropylene resin was Hercoprime PA-672 available from Hercules, Inc., which is a maleic anhydride modified polypropylene having an inherent viscosity of about 1.7, a carboxyl content of 0.6% to 1%, and a particle size range of 0.1 to 3 microns. The polypropylene resin was Hercotuf PB-681, available from Hercules, Inc., having a melt index of 6 and a particle size range of from 0.1 to 2 microns. A 20% solids dispersion of the carboxyl modified polypropylene-unmodified polypropylene resin mixture in kerosene was applied to the enamel coated surface of a steel can end of the type shown in the drawings.

After application of the carboxyl modified polypropylene-unmodified polypropylene dispersion, the coated end was baked at 180° C. to volatilize the solvent, fuse and coalesce the dispersed particles into a continuous film.

A closure member having a sealing flap of the type shown in the drawing, molded from Shell V521, a propylene/ethylene copolymer having an ethylene content of 4.0%, a melt index (D1238) of 0.55, and a density of 9.895 to 0.905 (D1505) was heat sealed to the carboxyl modified polypropylene coated side of the metal end using an RF heater and 37 milli-second dwell time at 200 lbs./in. pressure. The steel end was used to seal cans filled with beer. The sealed cans were exposed to pasturization conditions at 155° F. for 1 hour.

In a series of tests, before the propylene/ethylene copolymer sealing flap was heat sealed to the carboxylated polypropylene coated end, the seal area of the coated metal surface to which the sealing flap was to be bonded was coated with a 2% solids dispersion of the following materials:

(1) Ethylene/acrylic acid copolymer resin having a melt index of 300 and an acrylic acid content of 18% dispersed in an 80-20 mixture of toluene and isopropyl alcohol.

(2) Polymethylmethacrylate resin dispersed in chloroform.

(3) Polystyrene resin dispersed in trichloroethylene.

(4) Polycarbonate resin dispersed in chloroform.

In this same test series an ethylene/vinyl acetate copolymer resin having a melt index of 20 and a vinyl acetate content of 20% was incorporated in the dispersion of the carboxyl modified polypropylene-unmodified polypropylene mixture at a concentration of 10% by weight based on the weight of the total solids in the dispersion, before the dispersion was applied to the enamel coated steel end.

The heat sealed sealing flaps were tested against specified standards to determine the pop force required to initiate separation of the seal, the pull force required to almost completely separate the flap from the panel, and the detachment force required to complete the separation of the flap from the panel. The standard pop force for commercial acceptance generally should not exceed 8 pounds and the standard pull and detachment forces are generally not to exceed 15 pounds respectively. The test was performed on an Instron tensile tester which applied a constant strain rate of 2 inches per minute on the closure member.

The table that follows summarizes the results of the test series.

For purposes of comparison, the procedure of the example was repeated with the exception that in separate tests, the layers to be bonded either received no treatment or the carboxylated polypropylene coated end was treated with a nonpolar material outside the scope of the present invention such as a hydrocarbon wax or a polyethylene wax having a molecular weight of about 2000. The results of these comparative tests are also summarized in the table below.

TABLE

| Test No. | Treatment of carboxylated polypropylene coated panel before heat sealing of flap | Average [1] pop value (lbs./in.) | Average pull value (lbs./in.) | Average detach value (lbs./in.) | Appearance of peripheral heat seal area after separation |
|---|---|---|---|---|---|
| 1 | Ethylene/acrylic acid copolymer | 2.7 | 20.0 | 20.0 | Smooth, clean appearance. |
| 2 | Polymethyl methacrylate | ([2]) | | | Do. |
| 3 | Polystyrene | | | | Do. |
| 4 | Polycarbonate | | | | Do. |
| 5 | Ethylene/vinyl acetate copolymer | 2.6 | 6.6 | 3.9 | Do. |
| $C_1$ | None | 15.3 | 22.8 | 23.5 | Rough and jagged. |
| $C_2$ | Hydrocarbon | | | | Do. |
| $C_3$ | Polyethylene wax | | | | Do. |

[1] Average of 11 separate tests at 38° F.
[2] Means not tested.

By referring to the table, it is at once apparent that the treatment of a layer containing a carboxylated polypropylene resin with a polar polymer or a vinyl aromatic polymer prior to heat sealing a propylene polymer layer to the carboxylated polypropylene layer in accordance with the present invention (test numbers 1-5) causes the heat sealed propylene polymer layer to be more cleanly separable from the carboxylated polypropylene layer when compared with a carboxylated polypropylene layer which has either received no treatment prior to heat sealing (test number $C_1$) or has been treated with thermoplastic material outside the scope of the present invention (test numbers $C_2$ and $C_3$).

What is claimed is:

1. A method of preparing a cleanly separable seal between a propylene polymer layer adhered to a carboxyl modified polypropylene layer which comprises:
   (a) treating at least one of the layers with a normally solid thermoplastic polymer selected from the group consisting of vinyl aromatic polymers and polar polymers,
   (b) heat sealing the carboxyl modified polypropylene layer to the propylene polymer layer and then
   (c) cooling the heat sealed assembly to ambient temperature.

2. The method of claim 1 wherein the carboxyl modified polypropylene resin is the reaction product of polypropylene and an unsaturated dicarboxylic acid or anhydride containing about 0.05% to about 5% by weight carboxyl groups.

3. The method of claim 2 wherein the unsaturated anhydride is maleic anhydride.

4. The method of claim 1 wherein the propylene polymer is a propylene/ethylene copolymer.

5. The method of claim 1 wherein the thermoplastic polymer is polystyrene.

6. The method of claim 1 wherein the thermoplastic polymer is polymethyl methacrylate.

7. The method of claim 1 wherein the thermoplastic polymer is a polycarbonate.

8. The method of claim 1 wherein the thermoplastic polymer is an ethylene/acrylic acid copolymer.

9. The method of claim 1 wherein the thermoplastic polymer is an ethylene/vinyl acetate copolymer.

10. The method of claim 1 wherein the surface of the carboxyl modified polypropylene layer to be bonded to the propylene polymer layer is coated with the thermoplastic polymer.

11. The method of claim 1 wherein the thermoplastic polymer is blended with and incorporated in the carboxyl modified polypropylene layer.

References Cited

UNITED STATES PATENTS

| | | | |
|---|---|---|---|
| 3,232,789 | 2/1966 | Pelzek et al. | 161—252 U |
| 3,132,983 | 5/1964 | Osborne et al. | 161—183 X |
| 3,192,091 | 6/1965 | Hey et al. | 156—69 |
| 3,302,818 | 2/1967 | Balocca et al. | 220—53 |
| 3,381,717 | 5/1968 | Tyrrel | 161—252 X |
| 3,389,827 | 6/1968 | Abere et al. | 220—53 |
| 3,447,460 | 6/1969 | Vincent et al. | 156—334 X |

CARL D. QUARFORTH, Primary Examiner

E. A. MILLER, Assistant Examiner

U.S. Cl. X.R.

156—69, 306, 332, 334; 161—183, 252, 254, 406; 220—53